United States Patent [19]
Morita et al.

[11] 3,814,984
[45] June 4, 1974

[54] DEVICE FOR AUTOMATICALLY COMPENSATING DISCONNECTION IN HEAD LAMPS

[75] Inventors: Masayuki Morita, Tokoname; Yoshitaka Marui, Nagoya, both of Japan

[73] Assignee: Kabushiki Kaisha Tokai Rika Denki Seisakusho, Neshikasugai-gun, Aichi Pref., Japan

[22] Filed: Oct. 16, 1972

[21] Appl. No.: 298,018

[30] Foreign Application Priority Data
Oct. 14, 1971  Japan.............................. 46-81075

[52] U.S. Cl...................... 315/83, 315/90, 315/91, 315/93
[51] Int. Cl. ......................................... H05b 39/10
[58] Field of Search ............ 315/82, 83, 90, 91, 93, 315/119, 121, 124, 127

[56] References Cited
UNITED STATES PATENTS
3,479,557  11/1969  Schultz ........................... 315/82 X
3,532,929  10/1970  Schultz ............................ 315/82 X
3,671,955  6/1972  Malekzadeh...................... 315/83 X

FOREIGN PATENTS OR APPLICATIONS
1,456,707  9/1966  France................................. 315/82

Primary Examiner—Herman Karl Saalbach
Assistant Examiner—James B. Mullins
Attorney, Agent, or Firm—Woodhams, Blanchard and Flynn

[57] ABSTRACT

A device for automatically compensating a disconnection in a head lamp of a motor bicycle, employing a semiconductive switching element connected between a low-beam lamp circuit and a high-beam lamp circuit and adapted to become conductive when a voltage from an AC generator exceeds a predetermined value thereby to connect a high-beam lamp or a low-beam lamp to the AC generator for lighting the same when a disconnection occurs to the other lamp.

8 Claims, 3 Drawing Figures

3,814,984

DEVICE FOR AUTOMATICALLY COMPENSATING DISCONNECTION IN HEAD LAMPS

BACKGROUND OF THE INVENTION

This invention relates to a device for automatically compensating a disconnection in a head lamp, and more particularly to a device whereby a disconnection in a head lamp, particularly of a motor bicycle, may be automatically detected and compensated by lighting another head lamp which is not defective.

In the currently existing motor bicycles, especially in those motor bicycles which are mounted with an engine having a piston displacement volume smaller than 90 cc, the head lamp is directly connected to a generator as a main load thereof. Therefore, when the lamp current fails to flow due to a disconnection in the head lamp or a trouble or damage in the dimmer switch or lighting switch, the generator voltage rises extraordinarily (appro. to a value 2 times higher than the normal value), giving rise to a disconnection in other load lamps such as, for example, a meter lamp, high beam lamp, etc. Furthermore, the conventional motor bicycles are normally provided with only one head lamp, so that, if a disconnection occurs to the head lamp while in driving operation, the motor bicycles are placed in a dangerous condition with no lightings and cannot be recognized by a driver of a car coming from the opposite direction.

OBJECT OF THE INVENTION

The present invention aims to overcome the difficulty of the conventional motor bicyles mentioned above, and therefore it is the primary object of the present invention to provide a device for automatically compensating a disconnection in a head lamp of a motor bicycle from an abnormal rise in the generator voltage thereof and lighting another head lamp in place of the defective lamp.

Another object of the present invention is to provide a device for automatically compensating a disconnection in a head lamp of a motor bicycle, which employs a semiconductive material for effecting switching from a defective head lamp to a normal head lamp and which is free from errors in performance and has excellent durability on the motor bicycle which is usually subjected to mechanical shocks and vibrations.

A further object of the present invention is to provide a device for automatically compensating a disconnection in a head lamp of a motor bicycle, which is adapted to suppress an abnormal generator voltage rise due to the disconnection of the head lamp to prevent adverse effects on other lamps including an indicator lamp.

According to the present invention, there is provided a device for automatically compensating a disconnection in a head lamp consisting essentially of a high-beam lamp circuit including an AC generator, a lighting switch, a dimmer switch and a high-beam head lamp connected in a series loop; a low-beam lamp circuit including said AC generator, lighting switch, dimmer switch and a low-beam head lamp connected in a further series loop with the low and high beam lamps alternatively selectable by said dimmer switch; and a semiconductive switching element connected between said high-beam lamp circuit and said low-beam lamp circuit and adapted to become conductive when the voltage of the AC generator exceeds a predetermined value to a disconnection, or open circuit in one of the high-beam head lamp and the low-beam head lamp thereby to connect the other head lamp to the AC generator through said semiconductive switching element.

The above and further objects, features and advantages of the present invention will become more obvious from the following description when taken in connection with the accompanying drawings, which shows for purposes of illustration only one embodiment in accordance with the present invention.

DETAILED DESCRIPTION OF THE INVENTION

Figure 1:
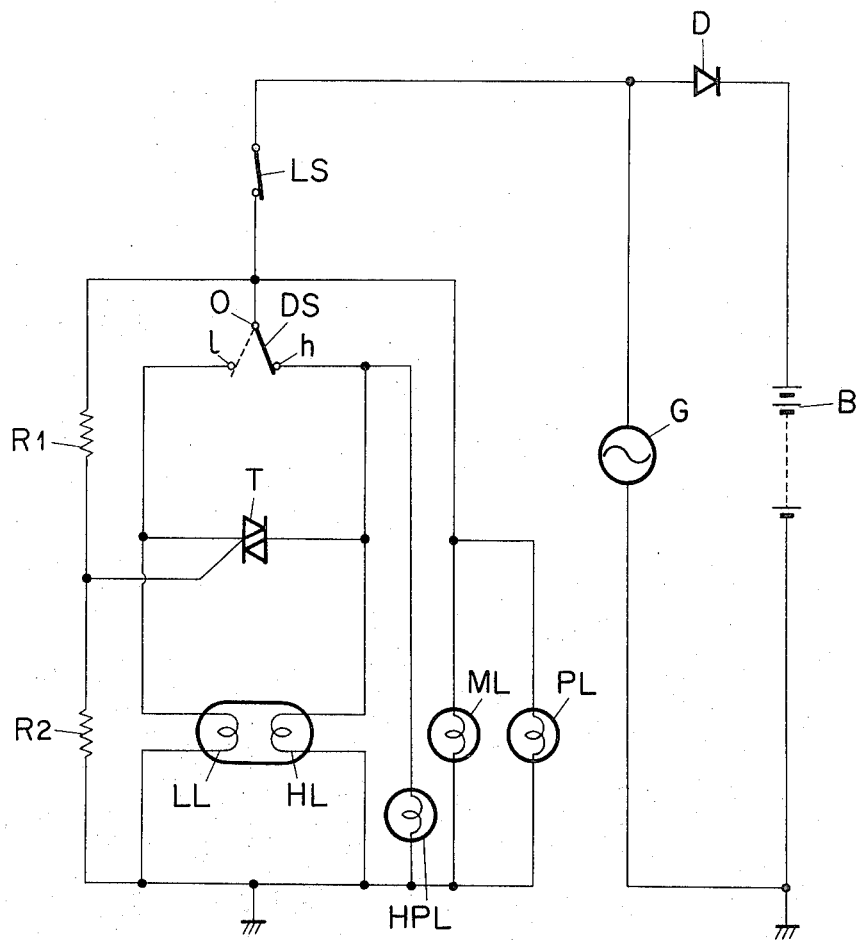
FIG. 1 is a diagram of a circuit arrangement employed in the device according to the invention.

THe invention will now be described in detail with reference to the accompanying drawings showing a preferred embodiment of the present invention. Referring to FIG. 1, there are shown at G an AC generator mounted on a motor bicycle and at D a rectifier diode, the anode of which is connected to the AC generator G. Designated at B is a battery, the positive pole of which is connected to the cathode of the diode D. The negative pole of the battery B and the remaining terminal of the AC generator are grounded. The reference character LS indicates a lighting switch one terminal of which is connected to the AC generator. In some motor bicycles with an engine of the 50 cc class, this lighting switch is incorportated in a main switch. There are shown at DS a dimmer switch having a movable contact $o$ which is connected to the lighting switch LS, and at T a semiconductive AC switching element, such as TRIAC or the like. The anode of the semiconductive AC switching element T is connected to a high-beam contact $h$ of the dimmer switch DS while the cathode thereof is connected to the low-beam contact $l$ of the same. The reference character L generally shows a head light. The corresponding high-beam lamp HL is connected between the high-beam contact $h$ of the dimmer switch DS and the ground side of generator G while the corresponding low-beam lamp LL is inserted between the low-beam contact $l$ and ground. There is shown at HPL a high-beam indication lamp having one terminal thereof connected to the contact $h$ and the other terminal thereof to ground. Reference characters MS and PL designate a meter illuminating lamp and a transmission neutral indication lamp, respectively. The respective one terminals of the meter illuminating lamp ML and the transmission neutral indication lamp PL are connected to the lighting switch LS, while the other terminals of the same are grounded. Indicated at $R_1$ and $R_2$ are dividing resistors connected in series. One end of the resistor $R_1$ is connected to the lighting switch LS while one end of the resistor $R_2$ is grounded. The junction between the resistors $R_1$ and $R_2$ is connected to the gate of the switching element T. In this connection, it should be noted that the resistors $R_1$ and $R_2$ are so adjusted that the gate bias of the switching element T is at such impedance that the element T is not conductive at the generator voltage available when the head lamp L is in normal operation. Thus, the switching element T remains non-conductive while the head lamp L is normally operating, but is rendered conductive when an abnormal rise occurs to the generator voltage due to a disconnection in the head lamp L.

Figure 2:
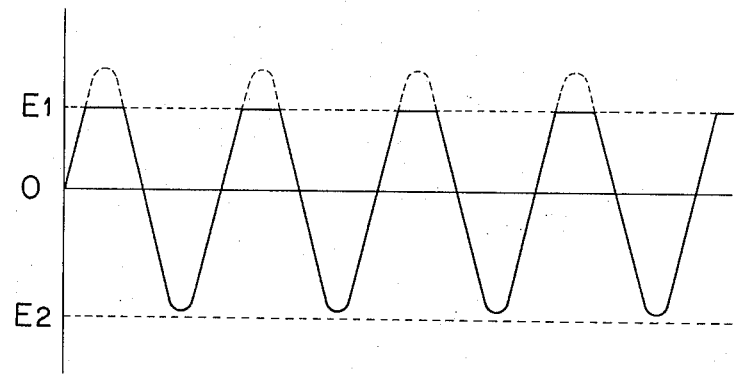
FIG. 2 is a graphical illustration of a generator voltage wave form when the head lamp is in normal operation.

The operation obtained by the above circuit arrangement will now be discussed. When both the high-beam lamp HL and the low-beam lamp LL of the head light L are normal, the positive half wave of the generator output voltage, being controlled by the battery B, is sliced at the battery terminal voltage $E_1$ as seen from FIG. 2, while the negative half wave of the generator output voltage in turn, being out of the control of the battery B, will be a normal sine wave the voltage of which is, however, lower than the generator voltage $E_2$ at which the switching element T becomes conductive, and thus the switching element T remains nonconductive. Accordingly, where the movable contact $o$ of the dimmer switch DS is in contact with the high-beam contact $h$, the high-beam lamp HL and the high-beam indication lamp HPL are lit. Furthermore, the meter illuminating lamp ML is also lit as the lighting switch LS is closed. The indication lamp PL is also lit when the transmission is in the neutral position. On the other hand, when the movable contact $o$ of the dimmer switch DS is in contact with the low-beam contact $l$, the low-beam lamp LL is lit and at the same time the meter illuminating lamp ML and the transmission neutral indication lamp PL are lit as well.

Figure 3:
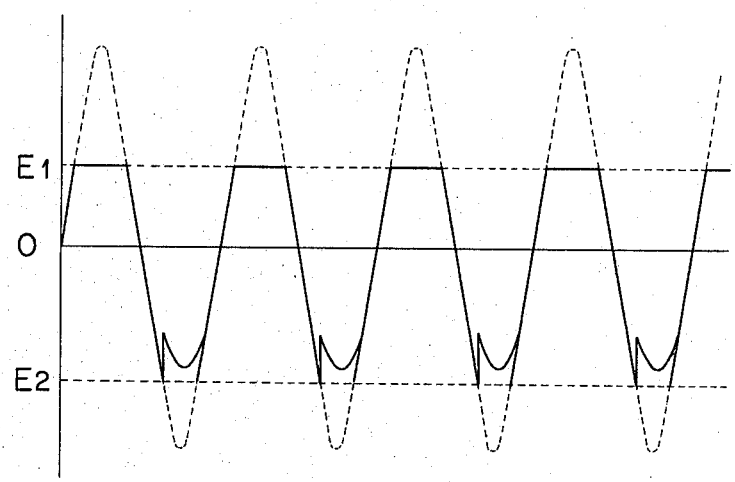
FIG. 3 is a graphical illustration of a generator voltage wave form when the head lamp has disconnection therein.

In case a disconnection, or open circuit, occurs in the high-beam lamp HL with the movable contact $o$ of the dimmer switch DS connected to the high-beam contact $h$, the generator positive half wave, being controlled by the battery B, is sliced at the battery terminal voltage $E_1$ as shown in FIG. 3, while the half wave of the negative side is not controlled by the battery B and the potential between the dividing resistors $R_1$ and $R_2$ is increased, due to the disconnection of the high-beam lamp HL, to the value of the generator voltage $E_2$ at which the switching element T is rendered conductive. Consequently, the switching element T becomes conductive, and thereby the low-beam lamp LL is lit only by the negative half wave.

Since the switching element T is made conductive at the generator voltage $E_2$ and the low-beam lamp LL takes the place of the high-beam lamp HL as a load of the AC generator G, the generator voltage will not exceed the value $E_2$, thus preventing an abnormal rise of the generator voltage.

According to the above described operation, the voltage to be applied to the low power lamps such as, for example, the high-beam indication lamp HPL, meter illuminating lamp ML, etc., is maintained below the rated voltage, so that their operation life will not be affected adversely.

Furthermore, in case where a disconnection occurs in the low-beam lamp LL with the movable contact $o$ of the dimmer switch DS connected to the low-beam contact $l$, the switching element T becomes conductive in the same manner as in the case of aforementioned disconnection in the high-beam lamp HL, and the high-beam lamp HL is lit by the negative half wave. A disconnection in the low-beam lamp LL can be visually detected immediately since the high-beam indication lamp HPL is lit at 1/2 of the normal illuminance. Even on such occasion, the meter illuminating lamp ML and the indication lamp PL are also lit, with no overcurrent as will break their wires.

As clear from the foregoing description, according to the present invention, there is employed a semiconductive switching element such as TRIAC for detecting the abnormal rise in the generator voltage caused by variation of load due to disconnection in the head lamp, by short-circuitting either the high beam circuit or the low-beam circuit to light the other lamp without delay as a load of the generator, thus ensuring safety driving with forward lighting. Further, the present device prevents an abnormal rise in the generator voltage which would adversely affect the load lamps other than the head lamp including a meter indication lamp, high-beam lamp and the like by lighting the other normal lamp in place of the disconnected defective lamp. Since the device of the invention employs a semiconductive element for effecting the switching of the head lamp, it is resistant to mechanical shocks and vibrations which usually occur on motor bicycles and, therefore, the device is highly reliable in operation.

While there has been shown and described only one preferred embodiment in accordance with the present invention, it is understood that the same is not limited thereto but is susceptible of numerous changes and modifications as known to a person skilled in the art, and therefore it it not intended to limit the present invention to the details shown and described herein but is intended to cover all such changes and modifications as are encompassed by the scope of the appended claims.

The embodiments of the invention in which an exclusive property or privilege is claimed are defined as follows:

1. In a device for automatically compensating a disconnection in a head light, the combination comprising:
   a high-beam head lamp;
   a low-beam head lamp;
   an AC generator, a lighting switch and a dimmer switch actuable for alternatively selecting either of said head lamps, said dimmer switch including means for connecting said AC generator, lighting switch and the selected one of said high-beam head lamp and low-beam head lamp in series loop to activate said selected head lamp, said AC generator being responsive to a disconnection in the selected head lamp for providing a voltage in excess of a predetermined value;
   a semiconductive switching element shunting said dimmer switch and connecting said high-beam lamp and low-beam lamp, said semiconductor switching element including means responsive to a generator voltage in excess of said predetermined value for conductively connecting the other said head lamp in series loop with said AC generator;
   whereby a disconnection in either operating head lamp automatically ignites the remaining head lamp.

2. A device as defined in claim 1 including unidirectional voltage limiting means and means connecting same across said AC generator for slicing the amplitude of first polarity half waves of said AC generator to a corresponding to the voltage limit of said unidirectional voltage limiting means, by AC generator conduction therethrough, said sliced amplitude value being insufficient for rendering said semiconductive switching element conductive during said first polarity half waves.

3. A device as defined in claim 2, in which said unidirectional voltage limiting means comprises a battery and including a diode in series loop with said AC generator and battery and oriented for blocking battery current flow to said head lamps.

4. A device as defined in claim 3, in which said AC generator is of a type having an output voltage inversely related to the load thereacross, the other polarity half waves of said AC generator being of voltage magnitude sufficient to actuate said semiconductive switching element with a disconnection in the selected head lamp, said semiconductive switching element having control electrode means so polarized as to be responsive to said other polarity half wave for actuating said semiconductive switching element.

5. A device as defined in claim 1 including a further lamp connected in parallel with at least said high-beam lamp, whereby said further lamp is protected against damaging overvoltage, upon disconnection in said selected head lamp, by said conduction of said semiconductive switching element.

6. A device as claimed in claim 1 in which said semiconductive switching element is a triac, said dimmer switch having alternatively selectable first and second contacts, said first contact being connected to said high-beam head lamp and to one main electrode of said triac and said second contact being connected to said low-beam head lamp and to the other main electrode of said triac, whereby said triac when activated provides a current flow path from the selected one of said contacts through the operable but nonselected one of said head lamps.

7. A device as claimed in claim 1 including a series pair of dividing resistors connected across said dimmer switch and said head lamps, said dividing resistors joining at a junction point, said semiconductive switching element being bidirectionally conductive and having a gate electrode connected to said junction point, the impedance of said dividing resistors being selected for rendering said semiconductive switching element conductive through either head lamp upon said disconnection in the other, selected head lamp.

8. A device as claimed in claim 1 in which each of said head lamps is directly connectible through said dimmer switch and lighting switch to said AC generator and without intervening voltage dropping impedances, main electrodes of said semiconductive switching element being directly connected without intervening voltage dropping impedances between each of said head lamps and alternatively selectible terminals of said dimmer switch.

* * * * *